United States Patent Office 3,348,914
Patented Oct. 24, 1967

3,348,914
PROCESS FOR RECOVERING OXIDES OF NITROGEN
Bernard Quanquin and Honoré Trimbach, Grand-Couronne, France, assignors to Potasse et Engrais Chimiques, Paris, France, a societe anonyme of France
No Drawing. Filed Apr. 28, 1964, Ser. No. 363,266
Claims priority, application France, Jan. 21, 1964, 961,015, Patent 1,391,087
6 Claims. (Cl. 23—161)

This invention relates to a process for recovering oxides of nitrogen (nitrous gases) from industrial gaseous effluents containing them.

In many industries, such as in the manufacture of nitric acid by catalytic oxidation of ammonia, nitration of organic products, pickling of metals, and so on, the waste or tail gases which still contain noticeable quantities of oxides of nitrogen are discharged to the atmosphere; not only are these oxides a source of air pollution injurious to the neighborhood, but furthermore they represent costly losses when larger units are considered.

It is well known that the oxides of nitrogen contained in waste gases can be scrubbed by aqueous alkaline solutions or suspensions, such as solutions of alkali metal hydroxides or carbonates, suspensions of earth alkali metal hydroxides (e.g., milk of lime), or the like. Nitrogen oxide gases comprise mainly two oxides (nitric oxide NO and nitrogen dioxide $NO_2$), and the reactions which occur during their absorption, for example in milk of lime, may be represented as follows:

(1) 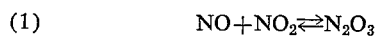
$$NO+NO_2 \rightleftarrows N_2O_3$$

(2) $N_2O_3+Ca(OH)_2 \rightarrow (NO_2)_2Ca+H_2O$ (3)
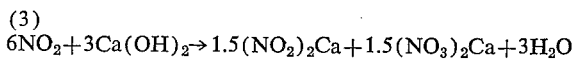
$$6NO_2+3Ca(OH)_2 \rightarrow 1.5(NO_2)_2Ca+1.5(NO_3)_2Ca+3H_2O$$

As may be seen from reaction (2), when the average degree of oxidation of the mixture of oxides is equal to $N_2O_3$ (that is to say when the oxides NO and $NO_2$ are in equimolar proportions), calcium nitrite is formed during the absorption process. When nitrogen dioxide $NO_2$ is present in excess to nitric oxide NO, the degree of oxidation is higher than $N_2O_3$ and a mixture of calcium nitrite and nitrate is obtained according to reaction (3), or according to reactions (2) and (3). In most cases, the degree of oxidation of oxides of nitrogen contained in industrial waste gases is higher than $N_2O_3$. If, on the contrary, the gaseous mixture to be treated contains an excess of nitric oxide, the degree of oxidation must be adjusted by adding a sufficient quantity of oxygen or air, because without this addition the excess of nitric oxide would not be absorbed.

Many methods have already been proposed for removing oxides of nitrogen from industrial gaseous effluent by using an alkali metal or earth alkali metal hydroxide or carbonate. However the solutions of nitrite-nitrate so obtained have no direct industrial use and furthermore cannot be discharged as sewage because they are strongly poisonous to plants. Usually the nitrite-nitrate solutions are treated with an oxidizing agent, particularly with nitric acid, so as to convert nitrite into nitrate with formation of nitric oxide which can be re-used. The solution obtained is concentrated by evaporation, and/or cooled to precipitate the nitrate contained therein. All these prior art methods have had practically no industrial application due to the difficulties encountered in recovering the nitrate and the cost of such recovery. In contrast, the present invention relates to a novel recovery process which makes it possible to recover the oxides of nitrogen from gaseous effluents in a satisfactory economical manner.

Further objectives, features, and advantages of the present process will be better understood from consideration of the following detailed description.

The invention concerns a process in which oxides of nitrogen, having an average degree of oxidation at least equal to $N_2O_3$, are scrubbed by an aqueous suspension of calcium hydroxide (milk of lime) and the nitrite formed during the absorption is oxidized, the process being characterized in that the scrubbing is carried out with a quantity of calcium oxide (lime) such that the solution obtained by absorption contains less than about 65 g./l. (preferably from about 50 to about 60 g./l.) of nitrogen present in form of calcium nitrite and nitrate, that at least 2 moles of sulfuric acid for 3 moles of calcium nitrite are added to the solution of calcium nitrite and nitrate, and that the nitric oxide evolved is recovered.

By adding sulfuric acid to the calcium nitrite-nitrate solution produced by absorption of oxides of nitrogen in milk of lime, the calcium nitrite present in the solution is oxidized according to a reaction which may be represented by the following equation:

(4) 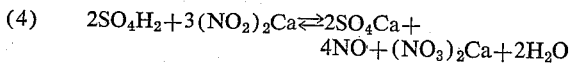
$$2SO_4H_2+3(NO_2)_2Ca \rightleftarrows 2SO_4Ca+ \\ 4NO+(NO_3)_2Ca+2H_2O$$

In order to effect oxidation according to reaction (4), a stoichiometric quantity of sulfuric acid is used, or preferably a slight excess, so as to achieve the decomposition of calcium nitrite as quickly as possible. In practice, about 1.10 to 1.25 times the stoichiometric quantity (that is to say, 2.2 to 2.5 moles of sulfuric acid for 3 moles of nitrite) has been found to give satisfactory results.

Nitric oxide evolved during the reaction may be readily recovered, for example, by recycling it to the manufacture of nitric acid. The solution of calcium nitrate containing calcium sulfate in suspension no longer contains any poisonous nitrite, and it therefore may be used directly; for example, it may be added to complex fertilizers during their manufacture or, on the other hand, it may be discharged as sewage without causing any inconvenience.

According to a preferred embodiment of the present invention, nitric acid may be recovered as well as nitric oxide. In this process embodiment sulfuric acid is added to the calcium nitrite-nitrate solution in sufficient quantity not only to oxidize all the nitrite present, but also to convert the nitrate formed during absorption of the nitrogen oxides and during nitrite oxidation. Thus calcium sulfate and nitric acid are obtained as shown by the following reaction:

(5)
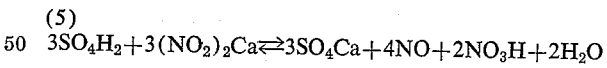
$$3SO_4H_2+3(NO_2)_2Ca \rightleftarrows 3SO_4Ca+4NO+2NO_3H+2H_2O$$

When operating according to the above embodiment of the process, a substantially stoichiometric quantity of sulfuric acid is preferably added (that is to say, about 1 mole of sulfuric acid for 1 mole of calcium nitrite), in order to obtain a final nitric acid solution substantially free of sulfuric acid. In either case, whether the recovery of nitric acid is desired or not, the calcium sulfate obtained by the process is easily filtrable so long as the concentration of the solution does not exceed 65 g./l. of nitrogen in the form of calcium nitrite and nitrate.

When the recovery of nitric acid is desired, the concentration of the calcium nitrite-nitrate solution is advantageously maintained between about 50 and 60 g./l. of nitrogen. Under these conditions, a nitric acid solution containing about 10 to 20% $HNO_3$ is obtained, such a concentration being satisfactory for subsequent industrial use. In particular, this solution can be recycled to the manufacture of nitric acid for the absorption of the nitrogen oxides. On the other hand, when the recovery of nitric acid is not desired, the nitrite-nitrate solution may contain less than 50 g./l. of nitrogen, and if the solution is to be discharged as sewage after oxidation of nitrite into nitrate, there is no objection to the nitrogen concentration being lower still.

It has been found that the absorption yield of nitrogen oxides decreases when the calcium nitrite-nitrate concentration of the solution increases. It is therefore particularly advantageous in industrial practice to employ several scrubbers disposed in series wherein the gases to be treated and the scrubbing solution circulate in counter-current flow. In the first scrubber, which is fed with the suspension having the lowest CaO content and with the gases having the highest oxides of nitrogen content, the major part of the nitrogen oxides is absorbed with a relatively low yield; in the last scrubber, which is fed with milk of lime substantially free of calcium nitrite-nitrate and with gases very poor in nitrogen oxides, the absorption is completed with a very high yield.

In order to avoid a loss of sulfuric acid during nitrite decomposition, the added quantity of milk of lime may be advantageously controlled so that the CaO concentration of the solution discharged from the single scrubber (or from the first scrubber, if several are disposed in series) does not exceed about 5 g./l., and is preferably maintained between about 3 and 5 g./l.

It has also been found that, in practice, the absorption yield of nitrogen oxides decreases when the temperature of the milk of lime increases: thus, all other conditions being the same, the absorption yields obtained, when operating the above-described process at a temperature ranging from about 20° to 30° C., have generally reached about 95%; whereas, when the temperature rose to about 55–60° C., the yields dropped down to about 75%. When milk of lime at ambient temperature is used to treat gases containing less than 0.5% of nitrogen oxides by volume, the temperature of the scrubbing solution does not usually exceed 30 to 40° C. without any external cooling being necessary, since the calories evolved by the chemical reactions are removed by water evaporation from the scrubbing solution. However, when treating gases having a higher content of nitrogen oxides, or when the temperature in the scrubbers tends to exceed 40° C., it is advisable to cool the circulating liquors by means of a suitable heat exchanger.

The process of the present invention may be carried out in any suitable apparatus which allows an intimate gas-liquid contact, such as columns packed with ceramic rings or grids, bubble-tray columns, spray towers and the like.

When the process is operated as described hereabove, an efficient scrubbing of gaseous effluents is obtained. In one instance, for example, after having been treated in a single column packed with Raschig rings, industrial gases, originally containing 0.25 to 0.40% nitrogen oxides by volumen (calculated as $NO+NO_2$), were discharged into the atmosphere containing less than 0.02% nitrogen oxides by volume.

The calcium nitrite-nitrate solution leaving the scrubbing system is then supplied to suitable apparatus for carrying out the oxidation step where sulfuric acid is added to the solution. This operation may be performed in a conventional type of mixer provided with an efficient stirring device for facilitating the evolvement of the nitric oxide formed during the reaction. A slight air bubbling may also be used if desired to improve the release of nitric oxide.

It has been found experimentally that, when the solutions of calcium nitrite-nitrate containing less than about 65 g./l. of nitrogen in form of nitrite and nitrate are used, the addition of sulfuric acid produces a calcium sulfate precipitate which can be easily and rapidly separated from the solution, by filtration for example. However, when nitrite-nitrate solutions having a concentration exceeding about 65 g./l. of nitrogen are employed, the filtration of the calcium sulfate precipitate is very slow, even though the temperature rises markedly—a condition which is known to facilitate the separation of calcium sulfate.

In industrial practice, with nitrite-nitrate solutions containing about 50 to 65 g./l. of nitrogen, the heat evolved through the addition of sulfuric acid is generally sufficient to permit a good separation of the calcium sulfate precipitate without the need for any external heating. When the solutions contain less than 50 g./l. of nitrogen, a smaller quantity of sulfuric acid is required, and thus less heat is evolved in the process. Nevertheless, the separation of the calcium sulfate, due to the low concentrations involved, remains easy and rapid even at ordinary temperature.

Although the novel features which are believed to be characteristic of the process of the present invention will be pointed out in the annexed claims, the invention itself, as to its objects and advantages and the manner in which it may be practiced, may be better understood by reference to the following examples taken in conjunction with the foregoing description.

*Example 1*

The scrubber comprised a column packed with Raschig rings at the top of which milk of lime was fed. Gaseous effluents containing oxides of nitrogen were introduced at the bottom of the column, and the scrubbed gases were discharged to the atmosphere at the top.

In this column 2000 m.³ of gaseous effluents (calculated at standard temperature and pressure conditions), containing 0.25% of nitrogen oxides, $NO+NO_2$, by volume (that is, a total quantity of 3.14 kg. of nitrogen in the form of oxides of nitrogen), were treated according to the process herein described. The initial concentration of the milk of lime introduced into the column was 110 grams of CaO per liter, and the temperature during absorption remained between 28 and 30° C. without any external cooling being provided.

The scrubbed gases discharged from the column to the atmosphere after treatment contained only 0.023% nitrogen oxides by volume, whereas in the column 54.6 liters of a solution containing 235.2 g./l. of calcium nitrite, 62.3 g./l. of calcium nitrate, and 5 g./l. of calcium oxide was obtained, corresponding to an absorption yield of 92%.

One half of this solution (i.e. 27.3 liters) was then treated with a substantially stoichiometric quantity of 98% sulfuric acid, in order to convert into calcium sulfate the total quantity of calcium present. That is to say, 5.300 kg. of sulfuric acid, calculated as 100% $H_2SO_4$, were added to the 27.3 liters of solution to neutralize the unconverted calcium oxide, to oxidize nitrite into nitrate, and to transform into sulfate the nitrate formed through absorption of the nitrogen oxides in the solution as well as that formed by oxidation of the nitrite. Altogether 1.3 m.³ of nitrogen oxides, i.e. of 0.76 kg. of nitrogen, were recovered and, after filtration of the precipitated calcium sulfate, 30 kg. of nitric acid containing 10% by weight of $HNO_3$ were obtained by the aforesaid process.

*Example 2*

The second half of the nitrite-nitrate solution remaining from the scrubbing operation (i.e. 27.3 liters) was treated in a manner designed to recover only the nitrogen oxides, and not nitric acid. Accordingly, 3.510 kg. of 98% sulfuric acid were added to this solution, and 1.35 m.³ of nitrogen oxides corresponding to 0.745 kg. of nitrogen were recovered.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. A process for recovering oxides of nitrogen present in industrial gaseous effluents, and said nitrogen oxides having an average degree of oxidation at least equal to $N_2O_3$, comprising the steps of scrubbing said gaseous effluents with an aqueous suspension of calcium hydroxide in an amount effective to absorb said nitrogen oxides and form a solution containing less than about 65 grams per liter of nitrogen present as calcium nitrite and calcium nitrate, and adding at least 2 moles of sulfuric acid for every 3 moles of calcium nitrite in said solution whereby said nitrite is oxidized and nitric oxide is evolved.

2. The process of claim 1 characterized in that calcium sulfate formed during said nitric oxidation step as a precipitate is easily and rapidly filtered from said solution.

3. The process of claim 1 wherein said scrubbing step is performed at a temperature lower than about 55° C.

4. The process of claim 1 wherein said nitrite oxidation is effected by the addition of about 2.2 to 2.5 moles of sulfuric acid for every 3 moles of calcium nitrite in said solution.

5. The process of claim 1 wherein said nitrite oxidation is effected by the addition of substantially 1 mole of sulfuric acid for each mole of calcium nitrite in said solution, thereby producing nitric acid in solution in addition to evolving nitric oxide.

6. The process of claim 1 wherein the amount of said aqueous suspension of calcium hydroxide is such that the formed solution contains substantially 50–65 grams per liter of nitrogen present as calcium nitrite and calcium nitrate.

References Cited

UNITED STATES PATENTS

| 1,029,528 | 6/1912 | Bosch et al. | 23—161 |
| 1,110,481 | 9/1914 | Collett. | |
| 3,034,853 | 5/1962 | Schmidt et al. | 23—161 X |

FOREIGN PATENTS

| 238,369 | 9/1911 | Germany. |
| 328,029 | 4/1930 | Great Britain. |

OSCAR R. VERTIZ, *Primary Examiner.*

B. H. LEVENSON, *Assistant Examiner.*